United States Patent [19]
Kuwahara

[11] Patent Number: 5,143,672
[45] Date of Patent: Sep. 1, 1992

[54] METHOD FOR FORMING EMBLEM OF THERMOPLASTIC SYNTHETIC RESIN FILM

[76] Inventor: Eiji Kuwahara, Excellence Shioya No. 105, No. 648-3, Aza Otani, Shioya-Cho, Tarumi-Ku, Kobe-Shi, Hyogo-Ken, Japan

[21] Appl. No.: 286,730

[22] Filed: Dec. 20, 1988

[30] Foreign Application Priority Data

| Dec. 23, 1987 | [JP] | Japan | 62-326417 |
| Dec. 24, 1987 | [JP] | Japan | 62-327889 |
| Dec. 28, 1987 | [JP] | Japan | 62-333488 |

[51] Int. Cl.$^5$ ............................. B29C 43/20
[52] U.S. Cl. .................. 264/132; 264/134; 264/243; 264/247; 264/248
[58] Field of Search ............. 264/247, 27, 293, 132, 264/134, 248

[56] References Cited

U.S. PATENT DOCUMENTS

4,130,623 12/1978 Walter .................... 264/293

FOREIGN PATENT DOCUMENTS

| 15353 | 6/1968 | Japan . |
| 49-980 | 1/1974 | Japan . |
| 27421 | 7/1974 | Japan . |
| 35992 | 10/1975 | Japan . |
| 35993 | 10/1975 | Japan . |
| 26235 | 7/1976 | Japan . |
| 54-70402 | 6/1979 | Japan . |
| 43180 | 12/1979 | Japan . |
| 60160 | 12/1982 | Japan . |
| 59-115900 | 7/1984 | Japan . |

Primary Examiner—Jay H. Woo
Assistant Examiner—R. Davis
Attorney, Agent, or Firm—Oliff & Berridge

[57] ABSTRACT

A method for forming a gold-laced emblem of thermoplastic synthetic resin film. A woven fabric-like fine uneven pattern is formed on an outer surface of the thermoplastic synthetic resin film having a metal deposited layer on a lower surface thereof. Instead, a woven fabric-like fine uneven pattern is formed on an outer surface of metal-interposed multi-layer thermoplastic synthetic resin film. The film is superposed on an upper surface of a base, and pressed by an engraving die. The engraving die has one or more fusion cutters having sharp cutting edges along a profile line of a pattern to be shaped, and one or more pressing cutters, an edge face of which is slightly above a cutting edge face of the sharp cutting edges. The film is high-frequency-induction-heated by the engraving die. The film is plasticized and the film of a quantity corresponding to portions intruded by the cutters is swelled to both sides of the cutters. The thermoplastic synthetic resin film pattern contacted with the pressing cutter edges of the pressing cutters is melted by the pressing cutters and reduced in thickness so that the base can be visually observed through the film. The thermoplastic synthetic resin film outside the profile line is removed.

14 Claims, 7 Drawing Sheets

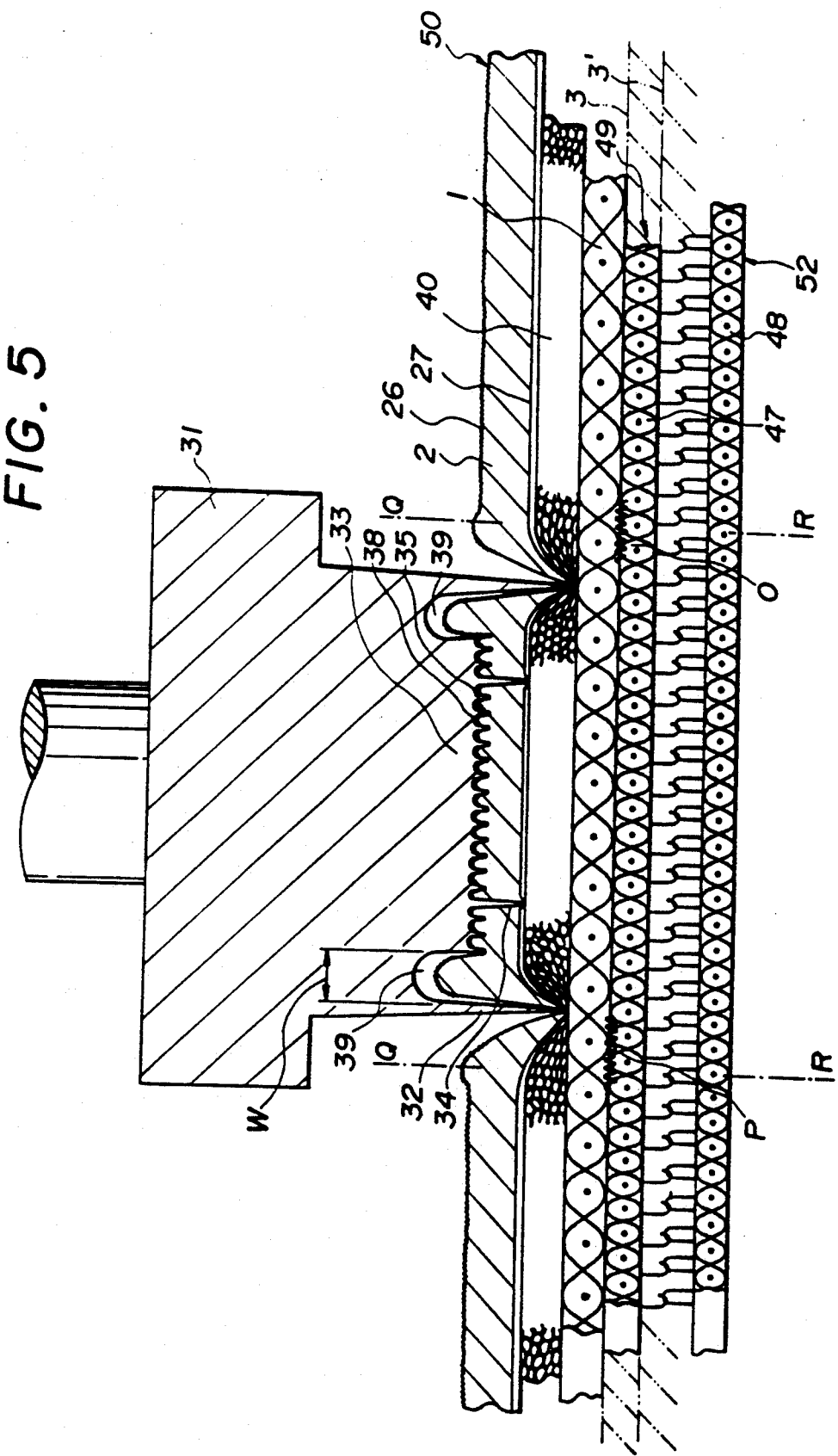

METHOD FOR FORMING EMBLEM OF THERMOPLASTIC SYNTHETIC RESIN FILM

BACKGROUND OF THE INVENTION

1. Field of the Invention

This invention relates to a method for forming a gold-laced emblem of thermoplastic synthetic resin film on a base for a uniform and a regulation cap.

2. Related Art

Method of forming an emblem, a sticker, etc. by using a thermoplastic synthetic resin film or sheet are known and disclosed in Japanese Utility Model Publication No. 50-35993 or Japanese Patent Publication No. 49-27421.

In the conventional methods, as shown in FIG. 10, a base material (K) and a thermoplastic synthetic resin film (J) are placed on an electrode die (I) for high-frequency-induction and are pressed and fusion-cut by an electrode die (A) for high-frequency-induction having fusion cutters B), (C), (D), (E) and (F) and pressing cutters (G), (H).

In the conventional method shown in FIG. 10, the thermoplastic synthetic resin film between the cutters (C) and (D) and between the cutters (E) and (F) are unnecessary, and thus removed manually by hair tweezers after formation is completed. The removing work of a wide portion between the cutters (E) and (F) is easy. However, when the interval therebetween is narrowed like the interval between the cutters (C) and (D), the removal of the unnecessary film portion becomes difficult. When the interval becomes 0.5 mm or shorter, it is impossible to remove it. Therefore, according to the conventional methods, it was impossible to form a fine line having 0.5 or less of width through which the base can be visually observed. Thus, the gold-laced emblem formed by the conventional method apparently lacks its high quality feeling and particularly has a disadvantage that gold-laced yarn pattern cannot be expressed.

Accordingly, a main object of this invention is to provide a method for easily forming a gold-laced emblem of thermoplastic synthetic resin film by die-pressing the thermoplastic synthetic resin film on the base to express a clear profile line of a pattern through which a fine (0.5 mm or shorter) line-like base can be visually observed and to provide a high quality emblem with clear line in which a shaped portion surrounded by the line is slightly swelled.

SUMMARY OF THE INVENTION

In order to achieve the above and other objects, there is provided according to the present invention a method for forming a gold-laced emblem of thermoplastic synthetic resin comprising the steps of: (a) forming a woven fabric-like fine uneven pattern on an outer surface of the thermoplastic synthetic resin film having a metal deposited layer on a lower surface thereof, (b) superposing the film on an upper surface of a base, (c) pressing the film by an engraving die having one or more fusion cutters having sharp cutting edges along a profile line of a pattern to be shaped and one or more pressing cutters, an edge face of which is slightly above a cutting edge face of the sharp cutting edges, (d) high-frequency-induction-heating the film by the engraving die so as to plasticize and swell the film to both sides of the cutters in a quantity corresponding to portions intruded by the cutters, and so as to melt the thermoplastic synthetic resin film by the pressing cutters at portions contacted with the pressing cutting edges of the pressing cutters to reduce a thickness of the film at the portions so that the base can be visually observed through the film, and (e) then removing the thermoplastic synthetic resin film outside the profile line.

The thermoplastic synthetic resin film is pressed and high-frequency-induction-heated by the fusion cutters and the pressing cutters. Due to the press and the heat by the fusion cutters and the pressing cutters, the film is fluidized to a space between the cutters in a quantity corresponding to a volume of the cutters intruding to the film. Accordingly, the thermoplastic synthetic resin film between the cutters is slightly swelled.

The thermoplastic synthetic resin film and metal deposited layer contacted with the sharp cutting edges of the fusion cutters are fusion-cut. The film melted by the heat is fusion-bonded to the base. The metal deposited layer at the positions pressed by the pressing edges of the pressing cutters are collapsed. Since the thermoplastic synthetic resin film at the positions pressed by the pressing edges of the pressing cutters are pressed in the melted state, part of the film at the position is impregnated into the base to thereby remarkably reduce its thickness so that the base can be visually observed.

Therefore, the invention provides a fine groove having a width of 0.5 mm or shorter so that the base can be visually observed through the film having fine width. Thus, according to the invention, a fine pattern line of the fine grooves can be also formed. The invention can express a gold-laced yarn seam pattern aligned at an interval of the fine width in a state that one yarn corresponding portions are swelled.

After the shaped portion is cooled, the engraving die is removed, unnecessary thermoplastic synthetic resin film out of profile lines is removed, and the film is punched out in a predetermined shape.

The foregoing object and other objects as well as the characteristic features of the invention will become more fully apparent and more readily understandable by the following description and the appended claims when read in conjunction with the accompanying drawings.

BRIEF DESCRIPTION OF THE DRAWINGS

FIG. 5 is an enlarged sectional view schematically showing a state forming an emblem according to second embodiment of the invention;

THE PREFERRED EMBODIMENTS OF THE INVENTION

Figure 1:
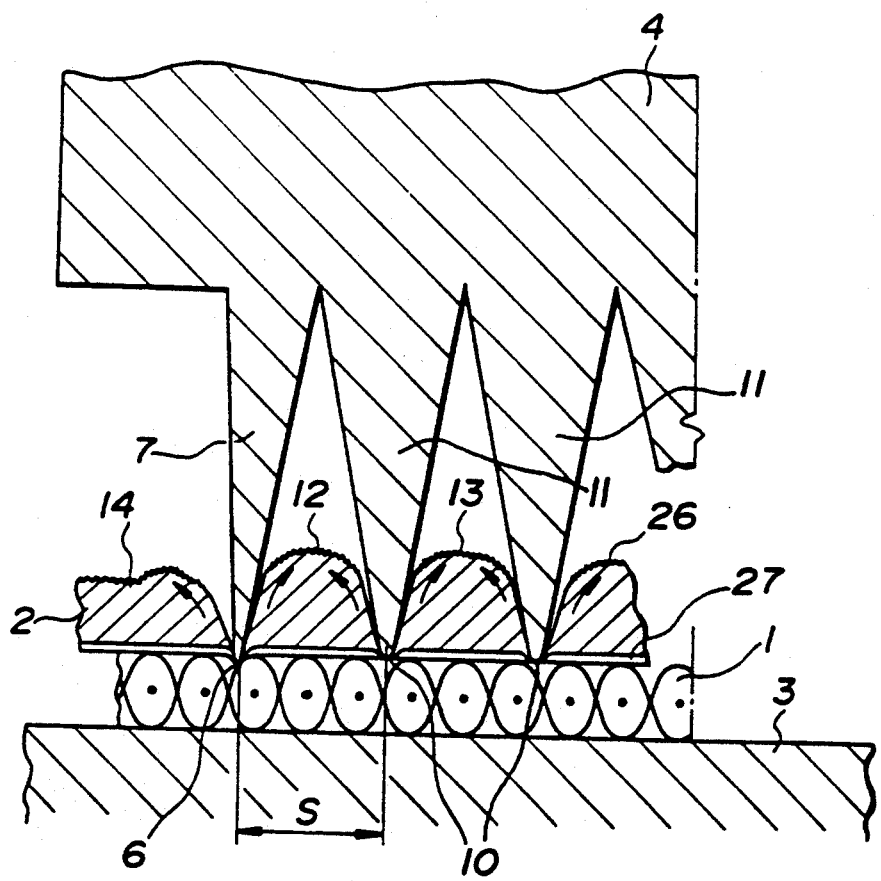
FIG. 1 is an enlarged longitudinal sectional view schematically showing a state of forming an emblem according to a first embodiment of the present invention.

FIGS. 1 to 4 show a first embodiment of a method for forming an emblem of thermoplastic synthetic resin film according to the present invention. In the present invention, a thermoplastic synthetic resin film 2 on a lower surface of which metal is vacuum-evaporated by known metal vacuum evaporation means to form a metal deposited layer 27 is used. A woven fabric-like fine uneven pattern 26 is formed by known means on an outer surface of the film 2. As schematically shown in FIG. 1, the thermoplastic synthetic resin film 2 is superposed on an upper surface of a base 1. The base 1 is placed on a die foundation 3 of one electrode for high frequency induction heating. The film 2 is pressed by an engraving die 4 of the other electrode for the high frequency induction heating to high-frequency-induction-heat the film 2.

The base 1 employs, for example, arbitrary materials, such as woven fabric, nonwoven fabric, synthetic leather, etc. The film 2 employs arbitrary thermoplastic synthetic resin, preferably vinyl chloride, or polyurethane.

A metal-interposed multi-layer thermoplastic synthetic resin film may be used instead of the above-described thermoplastic synthetic resin film 2 having the metal deposited layer 27 on the lower surface thereof. In this metal-interposed multi-layer film, a metal deposited layer is interposed in a sandwich state between films. The metal-interposed multi-layer film can be obtained by a method in which metal is vacuum-evaporated on a surface of a thermoplastic synthetic resin film and then another thermoplastic synthetic resin film is laminated on the deposited surface.

The metal employs known metals for vacuum-evaporation and preferably includes aluminum, chromium, or titanium. When the aluminum is used to form a gold-laced layer so as to form a gold-laced emblem, gold-color ink layer is placed on the deposited surface of the vinyl chloride film and a transparent vinyl chloride film is laminated on the ink layer.

Figure 2:
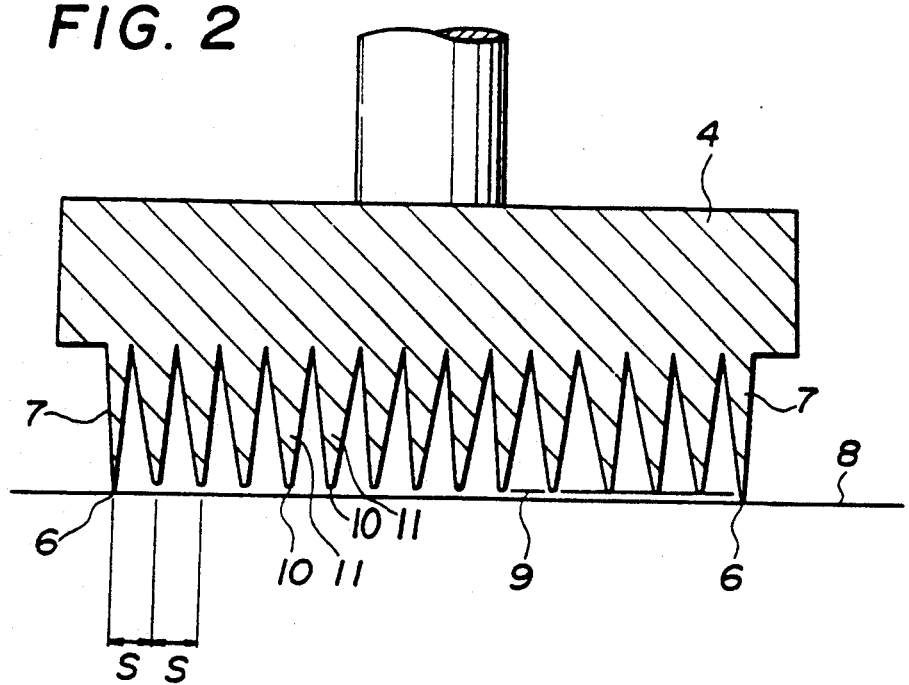
FIG. 2 is an enlarged longitudinal sectional view of an engraving die shown in FIG. 1.

The engraving die 4 has, as shown in FIGS. 1 and 2, one or more fusion cutters 7 having sharp cutting edges 6 along profile lines 5 (FIG. 3) of a pattern to be shaped, and one or more pressing cutters 11 having pressing edges 10. An edge face 9 of the pressing edges 10 is slightly above a cutting edge face 8 of the sharp cutting edges 6.

In the embodiment as shown in FIG. 2, the fusion cutters 7 and the pressing cutters 11 are arranged on the engraving die 4 at intervals S corresponding to the thickness of one decoration yarn for forming the periphery of a gold lace. Adjacent pressing cutters 11, 11 are arranged on the engraving die 4 at an interval S corresponding to the thickness of one decoration yarn for forming a gold lace. However, the structure of the engraving die 4 is not limited to such particular embodiment.

The pressing edge 10 of the pressing cutter 11 is not so sharp as the sharp cutting edge 6 of the fusion cutter 7. As will be described in detail, the pressing edge 10 is formed in size and shape to form a fine pattern line through which the base can be visually observed in a width of the designing size.

As schematically shown in FIG. 1, the pressing and high-frequency-induction-heating by the engraving die 4 fluidizes the thermoplastic synthetic resin film 2 at the position where the sharp cutting edge 6 of the fusion cutter 7 and the pressing edge 10 of the pressing cutter 11 are intruded, in a quantity corresponding to the intruded volume to both sides of the cutters as designated by arrows in FIG. 1. The thermoplastic synthetic resin film 2 between the cutters is slightly swelled as pattern portions 12 and 13.

At portions contacted with the sharp cutting edge 6, the thermoplastic synthetic resin film 2 and the metal deposited layer 27 are fusion-cut. At portions contacted with the pressing edge 10, the film 2 is oriented and the metal deposited layer 27 is collapsed. At portions contacted with the pressing edge 10, the thermoplastic synthetic resin film 2 is melted, partly impregnated into the base 1 to bond the film 2 with the base 1, and partly retained on the upper surface of the base 1 in an extremely thin layer such that the base 1 is visually observed to form fine grooves 17 and 18.

Figure 3:
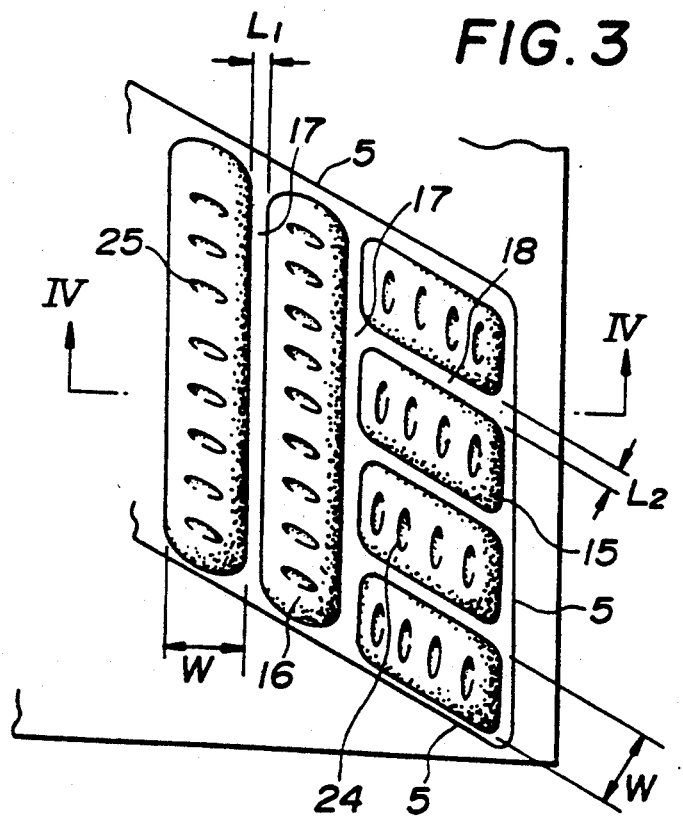
FIG. 3 is a schematic plan view showing part of an emblem formed according to the first embodiment of the present invention.
Figure 4:
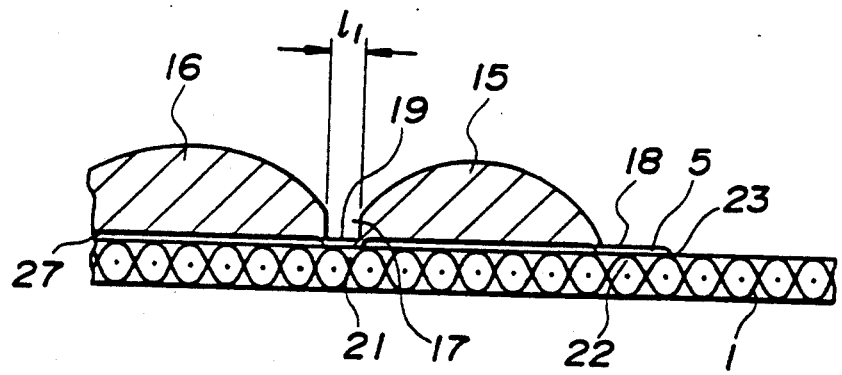
FIG. 4 is an enlarged schematic sectional view taken along the line IV—IV in FIG. 3.

FIG. 3 is a plan view schematically showing part of the gold-laced emblem formed by the above-mentioned method. Shaped portions 15, 16 having a width W of thickness corresponding to one gold-laced decoration yarn are formed between fine grooves 17, 18 of intervals of narrow width $L_1$, $L_2$, and swelled as shown in FIG. 4. In the bottoms of the fine grooves 17, 18, thin film-like remainders 19 through which the base 1 can be visually observed are formed by pressing the film 2 with the pressing edge 10 of the pressing cutter 11 as described above. The fine uneven pattern 26 remains so that uneven patterns 24, 25 are expressed on surfaces of the shaped portions 15, 16. The fine uneven patterns 24, 25 and a glossy surface of the metal layer provide gold-laced external appearance of the shaped portions 15, 16 clearly separated by the color-tone of the base 1 visually observed through the fine grooves 17, 18.

After the above-mentioned shaping steps are completed, the shaped pieces are cooled and the engraving die 4 is removed. Then, an unnecessary film portion 14 out of the profile line 5 is removed, and the base is punched out at a predetermined position outside of the profile line 5.

In FIG. 4, reference numerals 21 and 22 denote portions where the melted thermoplastic synthetic resin film is impregnated, and numeral 23 denotes a portion melted and cut by the sharp cutting edge 6.

A thermoplastic synthetic resin foamable sheet may be interposed between the base 1 and the thermoplastic synthetic resin film 2 so that the swelling degree of the shaped portions 15, 16 is increased. In this case, the thin metal layer 27 is formed between the thermoplastic synthetic resin film 2 and the foamable sheet. The foamable sheet employs, for example, vinyl chloride, polyurethane foamable sheets.

Figure 6:
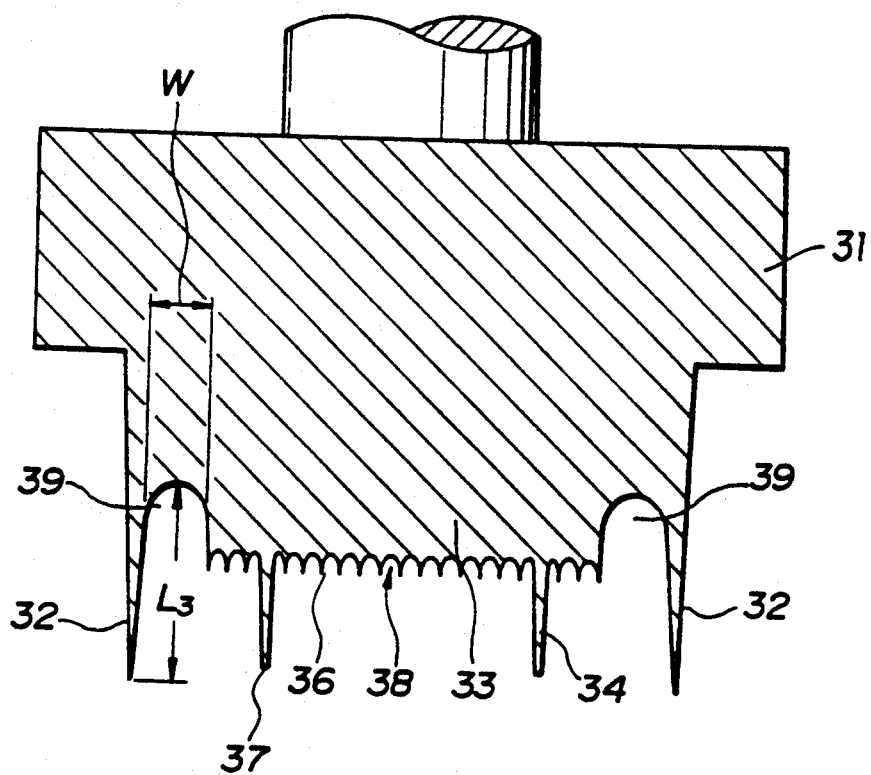
FIG. 6 is an enlarged sectional view of an engraving die shown in FIG. 5.
Figure 7:
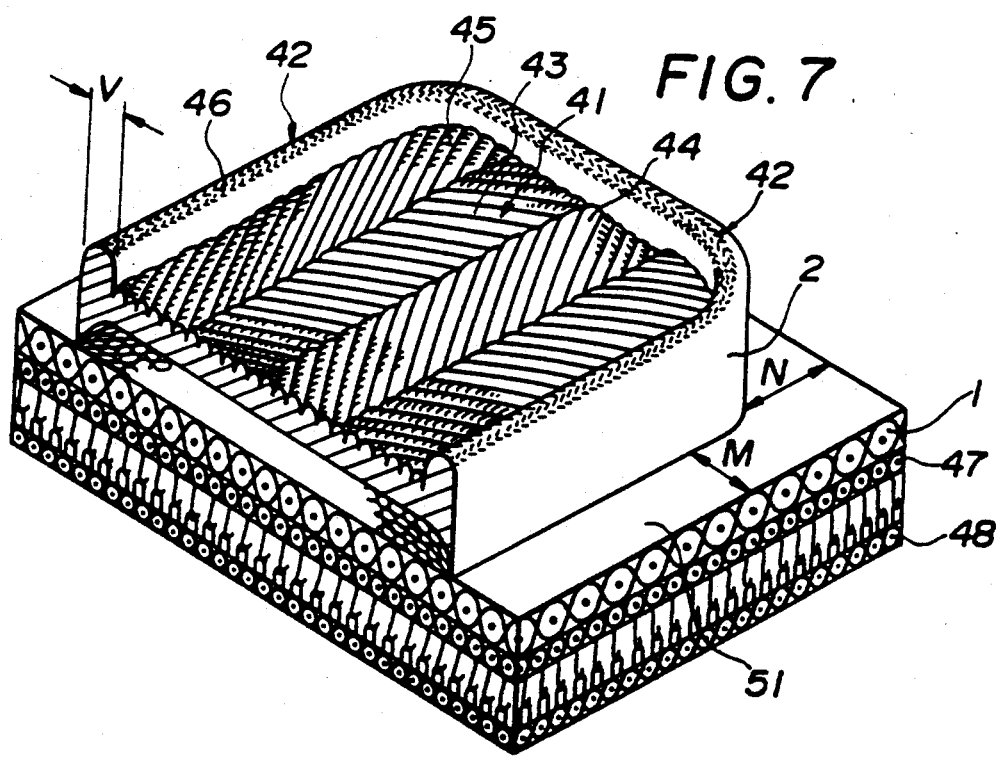
FIG. 7 is a schematic perspective view showing part of the emblem formed according to the second embodiment of the invention partly in a section.

FIGS. 5 to 7 show a second embodiment of the invention. In the second embodiment of the invention, an engraving die 31 shown in FIGS. 5 and 6 is used. The engraving die 31 has one or more fusion cutters 32 and a die presser 33. The die presser 33 has a plurality of pressing cutters, parts of which are formed as pressing pieces 35 and the other parts of which are formed as a pressing cutting edge 34. A depth of the pressing piece 35 is shallow to form a gold-lace yarn pattern. More specifically, an edge face of an edge 36 of the pressing piece 35 is much above a cutting edge face of a cutting edge 37 of the pressing cutting edge 34. Adjacent pressing pieces 35, 35 are arranged at an interval of thickness of one decoration yarn for forming a gold lace. A gold-laced yarn pattern 38 is formed by a plurality of the pressing pieces 35. Accordingly, a gold-laced yarn pattern is formed on the thermoplastic synthetic resin film 2 by the plurality of pressing pieces 35. The engraving die 31 has a groove 39 deeply cut between the die presser 33 and the fusion cutters 32. A width W of the groove 39 is substantially equal to a width V of a decoration yarn peripheral edge 42 of a gold-laced emblem 41 shown in FIG. 7. A depth $L_3$ of the groove 39 is formed deeper than an interval between an edge face of the die presser 33 and a cutting edge face of the fusion cutter 32. A woven fabric-like fine uneven pattern 25 is formed in advance on the outer surface of the thermoplastic synthetic resin film 2. A foamable sheet 40 is disposed between the film 2 and the base 1. A metal deposited layer 27 is formed in advance on the lower surface of the film 2 by vacuum evaporating metal.

The engraving die of the second embodiment of the invention has the construction as described above. A shape corresponding to the gold-laced yarn seam pattern 38 is formed on the film by the pressing pieces 35. The excessive portion of the thermoplastic synthetic resin film 2 generated by the intrusion of the fusion cutter 32 and the pressing of the die presser 33 is swelled in the groove 39, and slightly projected higher than the peripheral edge of the gold-laced yarn seam pattern pressed by the die presser 33. The woven fabric-like fine uneven pattern 26 formed in advance on the film 2 remains at least on top of the film 2 of the above-described gold-laced yarn seam pattern 38 and top of a portion of the thermoplastic synthetic resin film 2 swelled into the groove 39. Accordingly, the projected peripheral edge and the uneven pattern provide an external appearance like the decoration yarn peripheral edge of the gold lace emblem.

FIG. 7 is a schematic perspective view fragmentarily showing a gold-laced emblem obtained by the above-described second embodiment. Gold-laced yarn seam patterns 43, 44 are formed at a portion pressed by the die presser 33. A decoration yarn peripheral edge 42 is formed around the gold-laced yarn seam patterns 43, 44. Woven fabric-like fine uneven patterns 45, 46 corresponding to the pattern 26 on the outer surface of the film 2 are presented on tops of the gold-laced yarn seam patterns 43, 44 and the decoration yarn peripheral edge 42. Therefore, according to the second embodiment of the invention, the gold-laced emblem which exhibits an external appearance similarly to a gold-laced emblem made by an embroidering method, can be obtained.

A hook member 47 of a surface type fastener and a loop member 48 of the surface type fastener may be attached on a lower surface of the base 1 shown in FIGS. 5 to 7. The surface type fastener is mounted to the gold-laced emblem by the following method after the gold-laced emblem is formed by the above-described method. A sheet 49 of the hook member 47 is placed on a die foundation of one electrode for high frequency induction heating as designated by two-dotted line 3' in FIG. 5. An emblem sheet 50 formed with a plurality of emblems is superposed on the sheet 49. The base 1 and the sheet 49 are high-frequency-induction-heated at positions 0, P which apart from an peripheral end of the emblem at intervals corresponding to the widths M, N of an emblem periphery 51 (FIG. 7) so that the sheet 49 is fusion-bond to the base 1. An adhesive film may be interposed between the sheet 49 and the emblem sheet 50 so that the sheet 49 and the emblem sheet 50 are bonded by the adhesive film. Then, a sheet 52 of the loop member 48 of the surface type fastener is engaged with hooks of the sheet 49. The base 1, the sheets 49, 52 are punched and cut at Q-R line existing at positions separated at widths M, N from the fusion cut surface of the base 1 to obtain a product shown in FIG. 7. The surface fastener may be separately punched.

Figure 8:
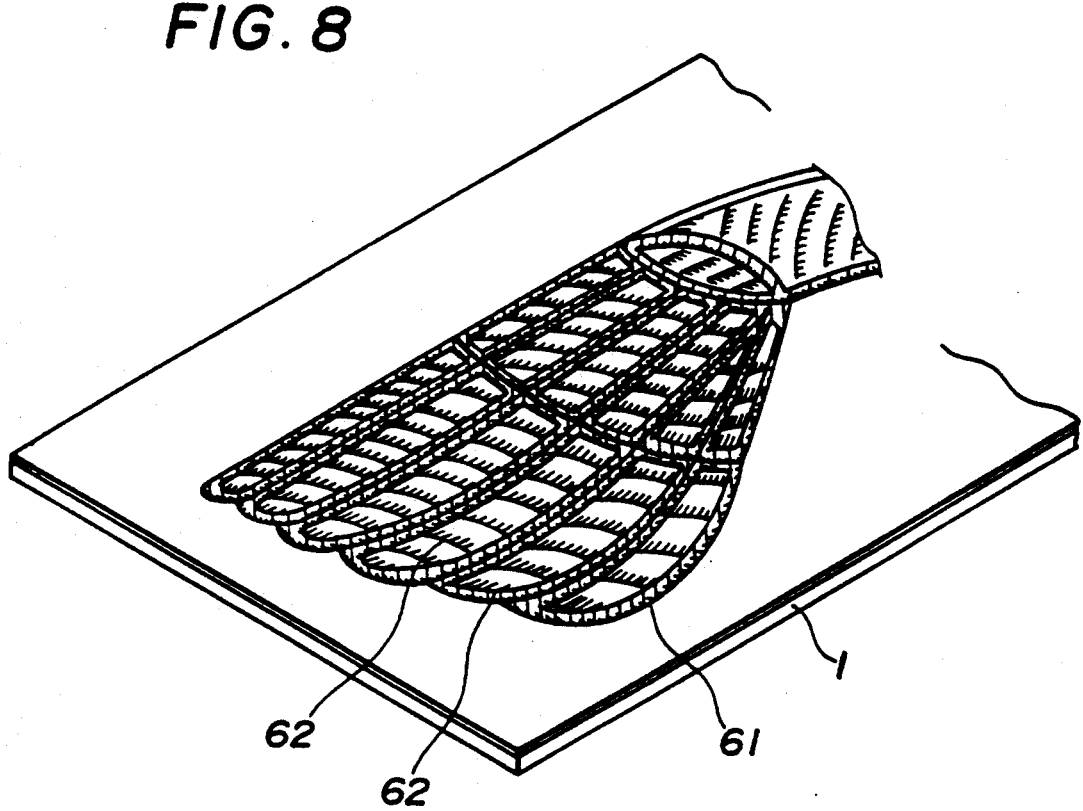
FIG. 8 is a partly omitted schematic perspective view showing an emblem formed according to third embodiment of the invention.
Figure 9:
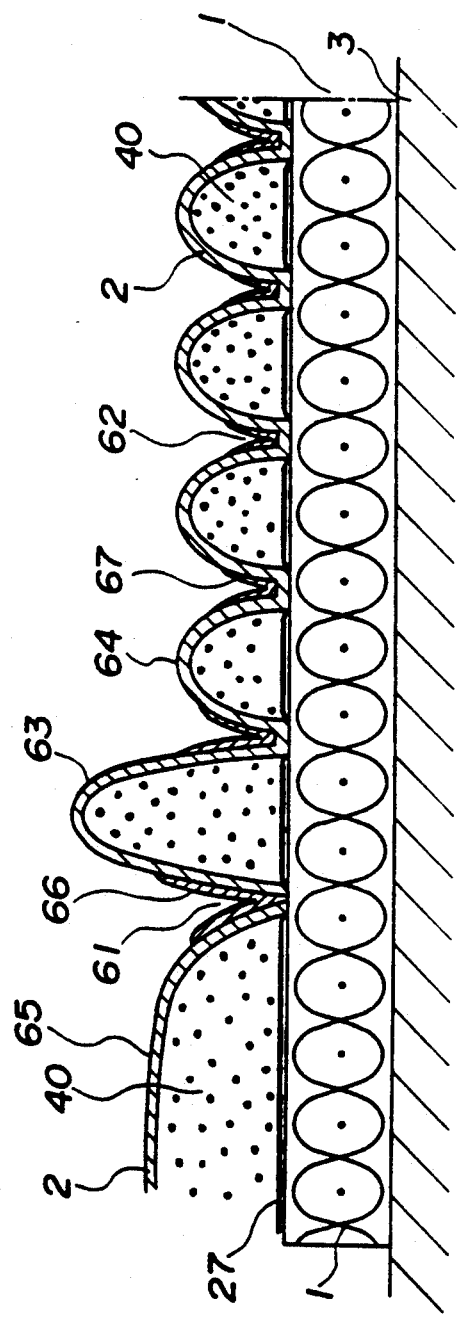
FIG. 9 is a schematic longitudinal sectional view of part of the emblem shown in FIG. 8.
Figure 10:
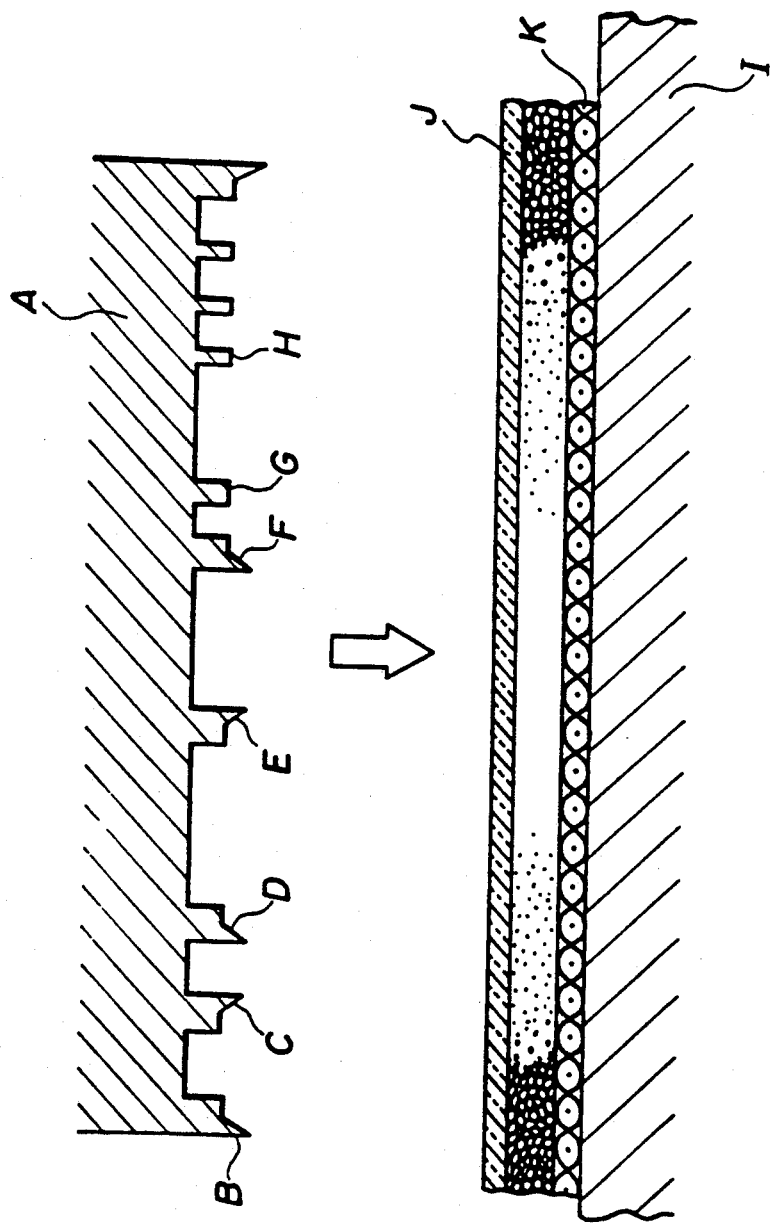
FIG. 10 is an enlarged longitudinal sectional view schematically showing a conventional method.

FIGS. 8 and 9 show a third embodiment of the invention. The third embodiment of the invention provides an old feeling of dense color-tone to recesses of decorations of an emblem of thermoplastic synthetic resin film.

In the third embodiment, the outer surface of the thermoplastic synthetic resin film 2 is coated uniformly with color paint to form a color coating layer. The color coating layer has dense colors of black, brown, etc., and is dissolved in a solvent to be described later. The paint includes, for example, printing ink, lacquer, etc. The base 1, the foamable sheet 40 and the film 2 are placed on the die foundation 3, pressed by the engraving die 4 or 31 as shown in FIG. 2 or 6, and high-frequency-induction-heated to form a profile line 61 of deep groove and pattern lines 62 of deep grooves. At this stage, the outer surface of the shaped thermoplastic synthetic resin film 2 is covered with the color paint layer. Then, the outer surface of the thermoplastic synthetic resin film 2 is wiped with a cloth impregnated with a solvent capable of dissolving the color paint. The solvent depends on the paint and may use, for example, thinner, xylene, or ethyl acetate. This wiping step removes the color paint layer at protrusions 63, 64, flat portions 65 or smooth recess part (i.e., the color paint film parts except color paint layer parts 66, 67 of the sidewall near the groove bottoms of the profile line 61 and pattern line 62) so as to visually observe a glossy surface of the thin metal layer. That is, the protrusion, substantially flat portion and smooth recess portion of the shaped emblem exhibit metallic glossy surface, and the pattern line portion sunk at abrupt angle exhibits old feeling by the remaining color paint layer. Since this wiping step is conducted in a state that the thermoplastic synthetic resin film 2 is superposed entirely on the base 1, the base 1 is not contaminated with the solvent and the dissolved paint, and the color paint film is uniformly removed by the uniform wiping work. After the wiping step, unnecessary film portions are removed, and individual emblems are punched.

The present invention is constructed and operated as described above. According to the invention, clear lines (such as the profile line of the pattern) having 0.5 mm or shorter width to be visually observed can be expressed only by the steps of pressing a thermoplastic synthetic resin film on a base by an engraving die, and high-frequency-induction-heating the film by the die so that shaped portion surrounded by the line can be formed in a slightly swelled state. As a result, according to the invention, high quality synthetic resin emblem having an external appearance like original gold-laced emblem, embroidered sticker, etc. can be inexpensively and efficiently formed.

According to the invention, the gold-laced emblem can be readily formed. Further, according to the invention, an emblem having old feeling can be efficiently formed in mass productivity.

What is claimed is:

1. A method for forming a gold-laced emblem of thermoplastic synthetic resin comprising the steps of:

(a) forming a woven fabric-like fine uneven pattern on an outer surface of the thermoplastic synthetic resin film having a metal deposited layer on a lower surface thereof, (b) superposing the film on an upper surface of a base, (c) pressing the film by an engraving die having one or more fusion cutters having sharp cutting edges along a profile line of a pattern to be shaped and one or more pressing cutters, an edge face of which is slightly above a cutting edge face of the sharp cutting edges, (d) high-frequency-induction-heating the film by the engraving die so as to plasticize and swell the film to both sides of each pressing cutter in a quantity corresponding to film portions intruded by each pressing cutter, and so as to melt the thermoplastic synthetic resin film by each pressing cutter at film portions contacted with the pressing cutting edges of each pressing cutter to reduce a thickness of the film at film portions pressed by the pressing cutting edges so that the base can be visually observed through the reduced thickness film, and (e) then removing the thermoplastic synthetic resin film outside the profile line.

2. The method according to claim 1, wherein an interval between said fusion cutter and said pressing cutter corresponds to a width of a first decoration yarn for forming a peripheral around a gold lace, and an interval of the adjacent pressing cutters corresponds to a width of a second decoration yarn for forming the gold lace.

3. The method according to claim 1, wherein a thermoplastic synthetic resin foamable sheet is interposed between said base and said thermoplastic synthetic resin film.

4. The method according to claim 1, wherein a part of said one or more pressing cutters is formed as a pressing piece, another part of said one or more pressing cutters is formed as said pressing cutting edge, a face of an edge of the pressing piece is much above a face of said pressing cutting edge, and adjacent pressing pieces are arranged at an interval of a width of a single decoration yarn for forming a gold lace.

5. The method according to claim 1, wherein said engraving die has a groove deeply cut between a presser cutter of said one or more presser cutters and a fusion cutter of said one or more fusion cutters.

6. The method according to claim 5, wherein a width of said groove is substantially equal to a width of a decoration yarn peripheral edge of said gold-laced emblem, and a depth of said groove is formed deeper than an interval between a face of an edge of the presser cutter and a face of an edge of the fusion cutter.

7. The method according to claim 1, wherein a sheet of a hook member of a surface type fastener is attached to a lower surface of said base between the steps (d) and (e).

8. The method according to claim 1, wherein in said step (a), color paint is further uniformly coated on the outer surface of said thermoplastic synthetic resin film to form a color coating layer, and before the step (e), the outer surface of the thermoplastic synthetic resin film is wiped by a cloth impregnated with a solvent for dissolving the color paint.

9. The method according to claim 8, wherein said color paint is printing ink or lacquer.

10. The method according to claim 8, wherein said solvent comprises one of xylene and ethyl acetate.

11. A method for forming a gold-laced emblem of thermoplastic synthetic resin comprising the steps of:

(a) forming a woven fabric-like fine uneven pattern on an outer surface of a metal-interposed multi-layer thermoplastic synthetic resin film, (b) superposing the film on an upper surface of a base, (c) pressing the film by an engraving die having one or more fusion cutters having sharp cutting edges along a profile line of a pattern to be shaped and one or more pressing cutters, an edge face of which is slightly above a cutting edge face of the sharp cutting edges, (d) high-frequency-induction-heating the film by the engraving die so as to plasticize and swell the film to both sides of each pressing cutter in a quantity corresponding to film portions intruded by each pressing cutter, and so as to melt the film by each pressing cutter at film portions contacted with the pressing cutting edges of each pressing cutter to reduce a thickness of the film at film portions pressed by the pressing cutting edges so that the base can be visually observed through the reduced thickness film, and (e) then removing the film outside the profile line.

12. A method for forming a gold-laced emblem of thermoplastic synthetic resin comprising the steps of:

(a) forming a woven fabric-like fine uneven pattern on an outer surface of the thermoplastic synthetic resin film having a metal deposited layer on a lower surface thereof, (b) uniformly coating the outer surface of the film with color paint to form a color coating layer, (c) superposing the film on an upper surface of a base, (d) pressing the film by an engraving die having one or more fusion cutters having sharp cutting edges along a profile line of a pattern to be shaped and one or more pressing cutters, an edge face of which is slightly above a cutting edge face of the sharp cutting edges, (e) high-frequency-induction-heating the film by the engraving die so as to plasticize and swell the film to both sides of each pressing cutter in a quantity corresponding to film portions intruded by each pressing cutter, and so as to melt the thermoplastic synthetic resin film by each pressing cutter at film portions contacted with the pressing cutting edges of each pressing cutter to reduce a thickness of the film at film portions pressed by the pressing cutting edges so that the base can be visually observed through the reduced thickness film, (f) wiping the outer surface of the thermoplastic synthetic resin film with a cloth impregnated with a solvent capable of dissolving the color paint, and (g) then removing the thermoplastic synthetic resin film outside the profile line.

13. A method for forming a gold-laced emblem of thermoplastic synthetic resin comprising the steps of:

(a) forming a woven fabric-like fine uneven pattern on an outer surface of a metal-interposed multi-layer thermoplastic synthetic resin film having a metal deposited layer on a lower surface thereof, (b) uniformly coating the outer surface of the film with color paint to form a color coating layer, (c) superposing the film on an upper surface of a base, (d) pressing the film by an engraving die having one or more fusion cutters having sharp cutting edges along a profile line of a pattern to be shaped and one or more pressing cutters, an edge face of which is slightly above a cutting edge face of the sharp cutting edges, (e) high-frequency-induction-heating the film by the engraving die so as to plasticize and swell the film to both sides of each pressing cutter in a quantity corresponding to film portions intruded by each pressing cutter, and so as to melt the film by each pressing cutter at film portions contacted with the pressing cutting edges of each pressing cutter to reduce a thickness of the film at film portions pressed by the pressing cutting edges so that the base can be visually observed through the reduced thickness film, (f) wiping the outer surface of the film with a cloth impregnated with a solvent capable of dissolving the color paint, and (g) then removing the film outside the profile line.

14. The method according to claim 8, wherein said solvent is thinner for said color paint.

* * * * *